April 12, 1927.
N. K. DAVIS
1,624,717
APPARATUS FOR TREATING FIBER BEARING MATERIALS
Filed Dec. 16, 1924
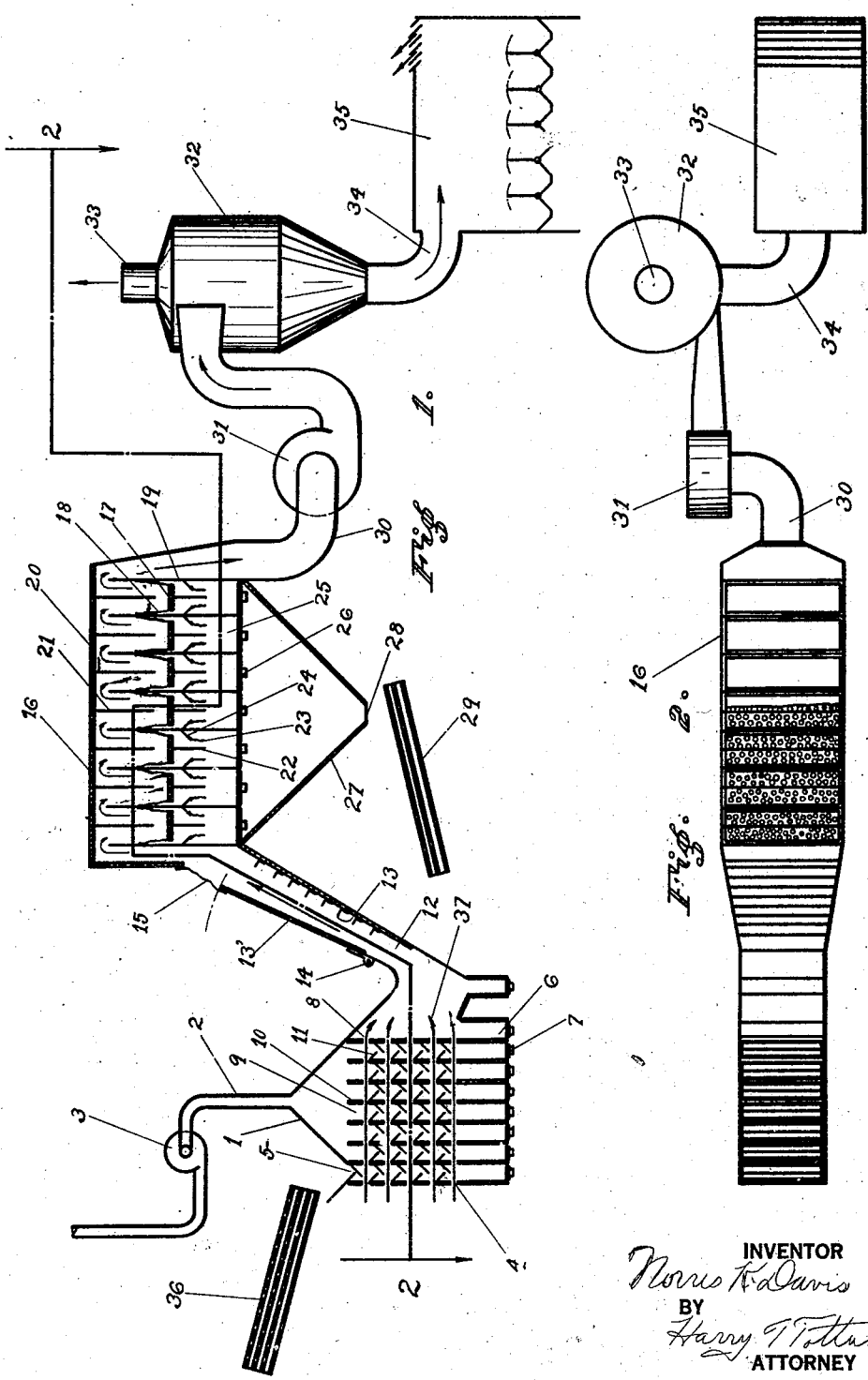

Patented Apr. 12, 1927.

1,624,717

UNITED STATES PATENT OFFICE.

NORRIS K. DAVIS, OF SAN FRANCISCO, CALIFORNIA.

APPARATUS FOR TREATING FIBER-BEARING MATERIALS.

Application filed December 16, 1924. Serial No. 756,207.

The present invention relates to an apparatus for the treatment of fiber bearing ores generally, for the separation and recovery of the fiber therefrom, and more particularly to a method of and apparatus for the separation and recovery of asbestos fiber from its enclosing rock. It has been discovered that in the treatment of the asbestos enclosing rock particularly in the shattering of the rock to release the asbestos clusters therefrom, that a considerable volume of fine dust is created which renders the crushed material difficult to handle in the ordinary apparatus without first screening the dust and baser material therefrom. It has also been discovered that by the action of air under pressure, preferably in advance of a stream of released asbestos fiber to draw the same, that the fiber is better and more quickly cleaned and is separated into individual strands or threads more quickly and more efficiently than by methods and apparatuses as at present employed.

It is the object of the present invention to carry out in an efficient and cheap manner the above mentioned discoveries and to quickly eliminate the dust and foreign material from the asbestos fiber and through the action of a body of air moving rapidly transverse to the general direction of the fiber in a to and fro course to separate the individual fibers from the clusters. A further object is to elevate the material with its contained dross material in a Venturi type passage to enable the heavy particles of dross material to separate by gravity from the fiber and to provide this passage with a movable wall whereby the cross sectional area of the same upwardly from its lower end may be varied, and to provide a conveying means for the material throughout the process.

For carrying out my invention I have disclosed the preferred form of apparatus, in the accompanying drawings, wherein—

Fig. 1 is a view in vertical section.

Fig. 2 is a view in longitudinal section, taken on line 2—2 of Fig. 1.

Referring to the drawings, the numeral 1 indicates a housing substantially rectangular in plan, having an upwardly tapering top from which extends an outlet 2, within which is positioned a fan 3 of small capacity sufficiently to draw light dust rising in the housing and to some extent overcome the gravitational effect upon the lighter particles. The housing, the interior of which constitutes the primary separating chamber, at one side is provided with a plurality of air inlet openings 4 arranged in superimposed horizontal relation, and with a material opening 5, and in its base is provided with a plurality of bins 6 normally cosed by counterbalance pivoted gates 7, of the well known type. The interior of the housing 1 is divided into horizontal and vertical passages, indicated by the respective numerals 8 and 9, by a plurality of horizontally disposed baffle supports 10, arranged in parallel spaced horizontal and vertical alignment, as in Fig. 1. Each of the baffle supports 10 carries on its opposite face a downwardly inclined outwardly projecting baffle 11, the baffle being arranged in staggered relation from opposite faces of the respective supports, with their outer edges overlapping.

The discharge side of the housing 1 is open, and extending therefrom is a duct 12 upwardly inclined, and the base wall thereof mounts a plurality of horizontally disposed parallel spaced baffles 13, and the upper wall 13′ of said duct is, at its lower end, hinged, as at 14, and at its upper end connected by a flexible member 15 with one end wall of a secondary separator 16.

The adjustable upper wall 13′ of the duct admits of the interior area thereof being increased upwardly from its lower end, thereby reducing the velocity of the air passing upwardly therein.

The material during its path of travel in its purification upwardly in duct 12 discharges into the secondary separating chamber 16, and said chamber has mounted in its interior a plurality of separating screens 17 suspended at the lower ends of fabric supports 18, the latter being secured to vertically disposed division walls 19 extending transversely of the secondary separating chamber 16, the upper ends of the walls 19 terminating short of the top 20 of the chamber 16, and depending between said walls 19 are baffles 21 extending downwardly from the top wall or cover 20 of the chamber 16, the baffles terminating short of the upper surface of the screens 17.

Disposed parallel with the baffles 21, between the walls 19 below the screens 17, are division plates 22, which are adapted to cooperate, under certain conditions, with the depending fabric seals 23, hung from members 24, extending outwardly from opposite sides of the walls 19, beneath the screens 17.

The bottoms of the chambers 25 formed beneath the screens 17 are normally closed by the counter-balanced gates 26, and a tapering discharge member 27 depends from the underside of the secondary chamber 16, the same being provided with an outlet 28 discharging onto an inclined screen 29.

From the discharge side of the secondary separating chamber 16 extends a duct 30 having mounted therein a suction fan 31, and said fan duct discharges into a centrifugal separator 32, having an outlet 33, for admitting a partial escape of the air and light dust and having a fiber discharge 34 erected horizontally onto one end of a classifier 35 of a type set forth in my issued Patent Number 1,484,208, February 19th, 1924.

The asbestos containing rock having been shattered by centrifugal action is discharged onto an inclined screen 36 where most of the dust is screened out and which delivers it into the opening 5.

The suction of the fan 31 creates an air current in the primary separating chamber 1, in the direction of the arrows 37, and the material entering the inlet opening 5 is, in its gravitating path of travel carried transversely of the primary separator, and the heavier particles of material gradually assume lower levels until a majority of the particles of shattered enclosing rock deposit into the bins 6, and the very light dust pulled off the fiber and rich particles by the air blast is drawn out by means of fan 3.

The fibers of asbestos with some particles of foreign material are drawn by the air suction upwardly in the duct 12 and the adjustment of the top wall 13 thereof, controlling the velocity of the air stream as the same ascends, provides a further cleaning or separating of the impurities from the fibers, the impurities being mostly heavier than the fiber, due to the reduced air velocity, follow the bottom wall 13 and finally deposit at the lower end of the duct 12.

The partially cleaned asbestos fibers are drawn by the air suction into the inlet end of the secondary separating chamber and travel in a circuitous path between adjacent walls 19 and the baffles 21. In their travel they are directed over the screen 17 which permits of the further separation of foreign material therefrom, due to the angular direction of travel of the fibers, and in their movement through the secondary chamber the clusters or gatherings of the fibers are separated into individual strands, thus assuring a further release of dirt, rock and other impurities therefrom. The dirt passes through the screens 17 and collects in the chambers 25, and at such time as the weight thereof is sufficient to overbalance one of the discharge gates 26, the gate is overbalanced and the material discharges onto the screen 29, through the opening 28 in the hopper 27.

To prevent the entrance of air into the secondary air chamber through the opening afforded by the operated gate 26, and to prevent the passage of dust upwardly through the screen above the operated gate, the action of the air is such as to draw the sealing flaps or fabric seals 23 upwardly in contact with the opposite sides of the wall member 22, thus sealing the interior of the secondary air chamber from the admission of air from a source other than the duct 12.

After the fibers have passed through the secondary separating chamber 16, they are comparatively clean and free from foreign material, and the same are drawn through duct 30 by the action of fan 31, passing through the fan into the centrifugal 32, where a portion of the air and the light remaining dust contained therein discharge through the outlet 33; the clarified separated fiber being discharged in a horizontal path into the classifier 35.

I claim:—

1. An apparatus for treating the finely divided fiber bearing ore for the separation and recovery of the fiber therefrom, comprising an upwardly inclined duct provided with a movable wall, enabling the gradual increase of the cross sectional area of the duct from its lower to its upper end, a primary material separating chamber discharging into the lower end of the duct, a secondary material separating chamber into which the upper end of the duct discharges, means for creating an air suction through said chambers and upwardly in said duct, means for directing fibrous material into the primary separating chamber, and means into which said suction means discharges for receiving the separated fiber.

2. An apparatus for treating finely divided fiber bearing ores, including a chamber provided with material inlet and outlet passages, said chamber being further provided with division walls therein terminating short of one chamber wall and providing a compartment within the chamber, a baffle wall extending between said division walls and terminating at a point below the free ends thereof, a screen disposed transversely within the compartment, a normally closed refuse outlet at the bottom of the compartment below the screen, means for creating an air suction at the air outlet passage, and automatic valve mechanism between said screen and refuse outlet for automatically closing on the opening of the refuse outlet.

In testimony whereof I have signed my name to this specification.

NORRIS K. DAVIS